June 18, 1963   N. F. CORNELIUS   3,094,448
METHOD OF MAKING INSULATED PLASTIC CONTAINERS
Filed March 9, 1959
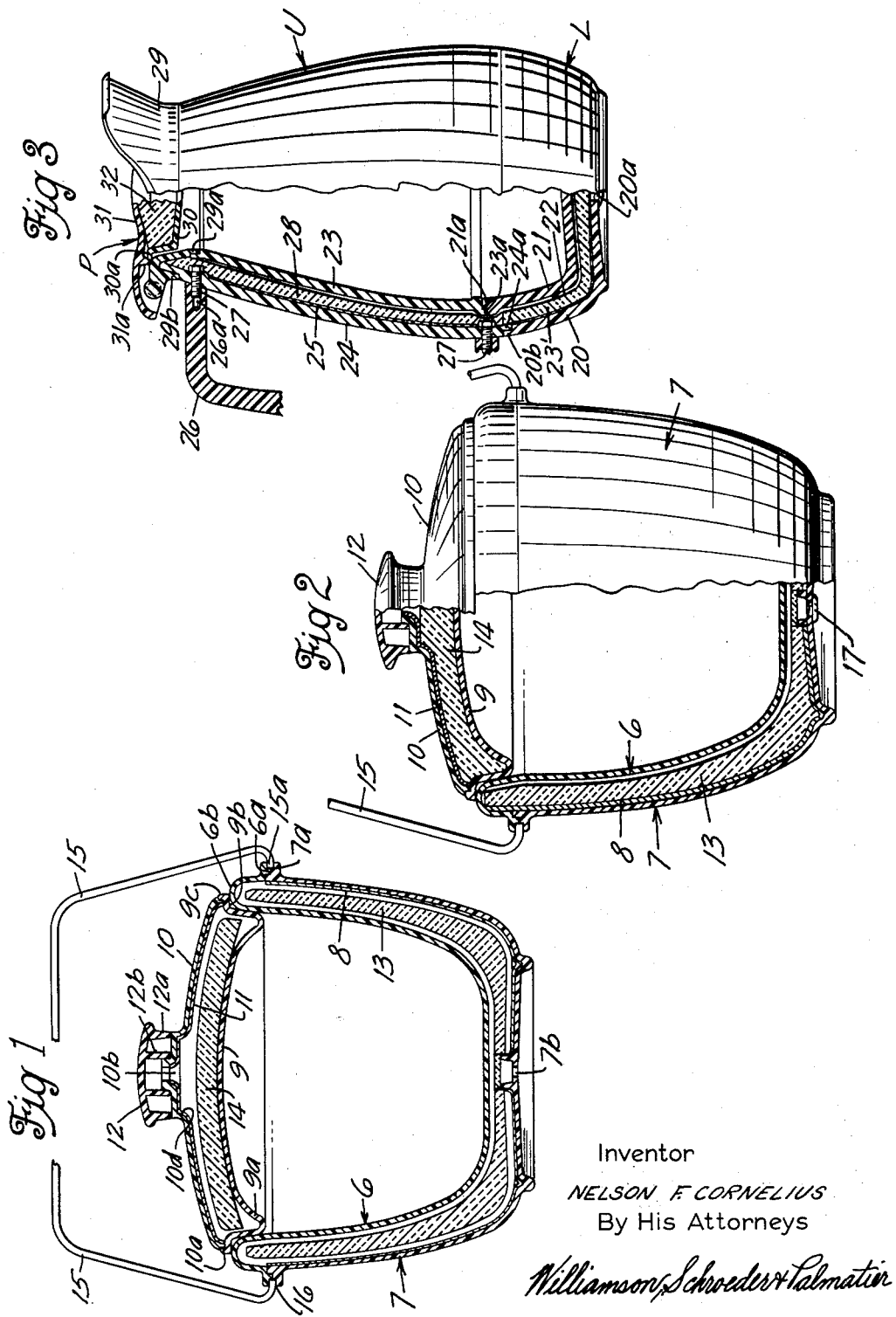
Inventor
NELSON F. CORNELIUS
By His Attorneys United States Patent Office 3,094,448
Patented June 18, 1963

3,094,448
METHOD OF MAKING INSULATED PLASTIC CONTAINERS
Nelson F. Cornelius, 2939 6th Ave. N., Anoka, Minn.
Filed Mar. 9, 1959, Ser. No. 798,228
4 Claims. (Cl. 156—78)

This invention relates generally to the production of containers or receptacles constructed at least for the most part from plastic materials and having very efficient heat-insulating properties, and adapted for wide general use in the receptacle art including servers and containers for foods, beverages, ice and heated material.

It is an object of my invention to provide a highly efficient, ornate receptacle structure constituted preferably of plastic materials throughout, and comprising a spaced double wall plastic shell structure made from thermo-setting or thermo-plastic materials having relatively high heat resistance, said walls defining an encircling chamber therebetween which is substantially filled with a reinforcing expanded plastic material having reduced heat resistance as contrasted with said double walled shell construction.

More specifically it is an object to provide a simple, highly efficient and commercial process for making a double walled heat-insulated receptacle or container wherein two pre-molded plastic shell members of relatively high heat-resistant material are joined with sealed effect along abutting edges or areas and wherein a preformed, heat-expansible plastic insulating liner or insert is first loosely applied between concentrically assembled shell members and is thereafter, by baking and simultaneously venting of air space between said shells, expanded to substantially fill the space between said shells to reinforce the joints between said shells and strengthen the entire assembled unit while providing for a most efficient insulation of the produced receptacle.

A further object is the provision of a highly ornate, efficiently insulated plastic receptacle particularly adapted as a container or server for cold and hot foods and beverages wherein two hard concentric plastic shells are employed, assembled and joined together in sealed relation to provide an annular insulating chamber and wherein the outer shell member is constructed of hard, transparent plastic material and is coated on the inside surface with reflective, preferably metallic material to provide against abrasion of the coating from the outside, and to give a deep luster appearance due to the lens effect of the transparent plastic, as well as to furnish a reflective barrier to radiant heat exchange externally of the assembled unit.

Before my invention the prior art utilized some double wall plastic containers in an effort to avoid vacuum-sealed glass insulators for hot and cold drink containers and the like and to thus overcome the inherent breakage occurring in glass insulators. In such prior art however, no satisfactory structure or method of reinforcing thin inner and outer shells to my knowledge, has been achieved. Where double walled containers in the form of plastic shells were utilized pliable or gaseous insulation material was employed in an annular insulating chamber defined between inner and outer shell members. As a result only with difficulty could thin plastic shells be used, since no reinforcing of sealed joints between the shells was possible without adding substantial weight and solid material or ribs in the insulating chamber. Plastic container devices of the prior art therefore, have been unnecessarily heavy or if constructed of two thin concentric shell members, have often with continued use and varying temperature conditions, become misshapen and often fractured some portions of the joining seal between the two shell sections, thus materially lowering the insulating efficiency.

With the unique container structure produced through my new process, plastic materials are employed throughout and a foam plastic reinforcer and insulator is expanded after the structure is assembled to provide a permanently bonded and exceedingly sturdy container structure with reinforcing of all portions of the shell walls including the sealed joints where the shell sections telescope or abut. An insulating and reinforcing liner of heat-expansible material such as styrene foam is preformed to first loosely fit between the shell sections thereby facilitating assembly and insertion and thereafter with the shell sections joined preferably by compatible cement medium, the assembled device is baked with a suitable vent aperture or apertures provided to permit escape of vapors in the air from the insulating chamber between the shells. The shells are molded of a high heat-resisting grade of thermo-plastic or thermo-setting-plastic material while the plastic (preferably foam) insulating and reinforcing liner begins to expand during baking at a temperature many degrees lower than the critical melting point of the outer and inner plastic shell members. It is therefore possible to control the desired expansion of the reinforcing insulator by the application of heat to the inner and outer shells, the time and temperature being readily controlled. The liner may thus be expanded as desired, to completely or substantially fill the insulating chamber designed by the two concentric shells.

The foregoing and other advantages of my invention, both as to structure and process, will be more apparent from the following description made in connection with the accompanying drawings wherein like reference characters refer to similar parts throughout the several views and in which:

FIG. 1 is a vertical sectional view taken diagrammatically through a lid-covered insulated container adapted to hold hot or cold food, ice, beverages and the like, showing the respective outer and inner shell members of the body and lid joined together with sealed effect and with the heat-expansible, pre-formed liners loosely inserted before expansion thereof through baking steps;

FIG. 2 is a view of the same container assembly shown partly in side elevation and partly in diagrammatical vertical section after the baking action is completed to expand the reinforcing and insulating liner and after insertion of a vent plug shown in the bottom portion thereof;

FIG. 3 is a view partly in side elevation and partly in diametrical, vertical section showing an embodiment of my invention in the form of an insulated pitcher-type server which utilizes to obtain upwardly tapered construction, two sets of inner and outer shell sections and two sets of preformed foam plastic liners, the structure as shown being completed through the expansion of the foam plastic liner.

While only two embodiments of insulated plastic receptacles constructed in accordance with my novel process are illustrated, it will of course be understood that a large variety of different receptacles, containers and food and beverage servers of novel construction may all be produced commercially through the carrying out of my novel process.

Referring now to production of the lid-covered insulated container illustrated in FIGS. 1 and 2, I first mold for the body of the container, inner and outer shells indicated as entireties by the numerals 6 and 7 respectively from high heat-resisting grades of plastic which when molded are hard and substantially rigid. Thermo-plastic materials such as for example a copolymer of polystyrene and acrylonitrile may be successfully utilized with at least the outer shell 7 thereof being preferably transparent. The shells 6 and 7 may also be constructed from thermo-setting plastics by molding the said shells by compression from suitable thermo-setting materials such as phenolics, melamines, etc. In the container of novel construction illustrated in FIGS. 1 and 2, the inner and outer shells 6 and 7 while having their walls for the most part concentrically disposed in spaced relation, also have slip joint or abutment edges 6a and 7a which as shown, are formed on the outer shell 7 along the upper marginal edge while the inner shell 6 at its upper portion, is molded to form a rounded out-turned edge 6b which is flattened and shouldered at its under surface for abutment and sealing junction with the edge 7a of the outer shell.

The inner surface of the transparent outer shell is preferably for manifold purposes hereinafter set forth coated with a thin layer of reflective, preferably metallic material such as a bronzing lacquer or metal applied through utilization of a vacuum metalizing process or by an application and adherence of a thin metallic foil to form such coating, identified as 8 in FIGS. 1 and 2. A small venting aperture 7b is concentrically formed as shown in the bottom of outer shell 7 communicating with the space between the inner and outer shells when they are assembled as shown in FIG. 1, to permit escape of vapors and air during a subsequent baking process step later to be explained.

The removable lid member of the container or receptacle constituting an inner shell member 9 and an outer shell member 10 is constructed in generally similar manner to the construction of the body of the receptacle and said shells are made of similar materials to the body shell.

Inner shell 9 of the lid has an annular marginal depending flange 9a, which externally is adapted to fit within the confines of the upper rounded edge 6b of the body of the receptacle with sealed effect, a horizontal outturned annular shoulder 9b being provided for abutment against the top of the rounded upper edge 6b of the body.

The outer shell 10 of the lid member is also constructed of high heat-resisting grade of plastic and is preferably transparent and has an outturned sealing flange 10a depending and offset from the slightly domed shape of the main portion of shell 10 adapted to interfit and abut a slightly upturned sealing flange 9c provided in the shouldered marginal portion of the inner shell member 9 of the lid.

A vent aperture 10b is centrally formed through the central portion of the outer lid shell 10 communicating with the chamber defined between the two shells 9 and 10.

The inner surface of the outer shell 10 of the lid is preferably coated with a reflective metallic coating 11 of similar nature to the coating 8 of the outer shell of the receptacle body. The vent aperture 10b when the structure is in its completed form, as shown in FIG. 2, is closed by an ornamental handle and closure shell 12 which has as shown, two concentric annular depending flanges 12a and 12b which are ultimately cemented in sealed relation with appropriately contoured edges at the central portion of the outer shell 10 of the lid.

According to my process, I preform by molding of a heat-expansible, preferably foam-type plastic material, insulating and reinforcement liners for both the receptacle body and the double shelled lid member. Styrene foam plastic material is ideal for such purpose, particularly since when premolded and not cured, it starts to expand at about 180 degrees F., which is from thirty to fifty degrees lower in temperature than the critical point of deformation or melting of the harder shell sections 6 and 7 of the receptacle body and shell sections 9 and 10 of the lid member.

The reinforcing and insulating liner 13 of the receptacle body is of generally similar and symmetrical shape to the general contours of the inner and outer hard shells 6 and 7 but is purposely preformed to very loosely fit the insulating chamber defined between the two shells 6 and 7 whereby the expansible liner may be readily slipped between the shells 6 and 7 in the assembly thereof.

Similarly, the preformed molded liner 14 for the lid member very loosely fits within the insulating chamber defined between the lid shells 9 and 10 and need not be molded to specifically conform to the depending flange 9a of annular shape or to the upwardly bossed portion 10d of the outer shell of the lid.

As shown, I have applied a hinged bail or handle 15 to the upper portion of the receptacle body by insertion of inturned trunnion elements 15a in bossed bearings 16 disposed diametrically on opposite sides of the upper portion of the receptacle body and as shown, being split between the joined edges of the inner and outer shells 6 and 7.

In the carrying out of my process, it is essential that quality controls be maintained during all stages of manufacture.

This is especially true in the application of compatible solvent cements for joining the slip, telescopic or abutment joints between the inner and outer shells, in order that an even application of the cement is assured and that rapid production may be obtained. I have found that common methods for joining and sealing plastic elements by cement such as application thereof through felt pads, pressure guns, syringes and the like will not give the desired results to produce my improved structure. My method of uniform application of cement to the abutment edges of both inner and outer shells involves rotating the shell members to be cemented in a suitable fixture and applying a roller against the portion or flange to be cemented. The roller is mounted on free turning bearings which are protected from solvent cement by such means as slingers. The outer periphery of the roller is knurled or ribbed and is shaped to cover the marginal portions desired for the juncture while the roller revolves and simultaneously small teeth from the knurled or ribbed surface, contact the plastic. During the application of cement, the roller assembly is carried by a slide mechanism which exerts a pressure on the rotating plastic parts. As the plastic part rotates, the teeth on the roller carry a minute quantity of solvent to the desired area and the rolling action of the roller and teeth tend to expedite the softening effect of the solvent by grinding action. By timing this rolling action any desired amount of cement application and softening of plastic may be readily carried out and duplicated. Also the speed of rotation of the plastic part, together with baffles or guards around the periphery of the roller may be employed to provide variation in obtaining the desired effect.

In my process when the slip joint or abutment sealing portions of the inner and outer shell sections (6 and 7 in the receptacle body and 9 and 10 in the insulated lid member) are properly softened and uniformly coated with the softening cement, the cooperating shell members are assembled with of course the preformed insulating and reinforcing liner being loosely slipped therebetween, usually in surrounding position relative to the inner shell member before application of the outer shell member. The cemented joints of the two shell members are then uniformly pressed together in a jig and are uniformly clamped for a short duration of time to enable the cement to thoroughly harden and weld the sections together.

During the aforesaid assembly of the respective cooperating shell sections with the liner interposed therebetween, the insulating chamber defined between the two shells is kept vented for escape of cement solvent vapors and air and this is continued throughout the clamping step and hardening of the softening cement.

The next and the vital step consists in baking the entire unit in a closely controlled oven with high velocity air circulation preferably directed horizontally with the shell assembly disposed transversely to the line of travel of the heated air. The heat cycle is preferably programmed over a period of from two to three hours with a temperature starting at in the neighborhood of 135 degrees F. and being gradually increased during the first hour of baking to approximately 195 degrees where the materials for the hard shell members and the insulating liner are those specified or the equivalent.

The styrene or other foam insulating and reinforcing liner starts to swell at about 180 degrees F. which is from 30 to 40 degrees lower than the deforming or critical point of the hard inner and outer shells. The desired expansion of the insulator may therefore be very accurately controlled by the application of heat to the outer and inner shells through variation in time and temperature of the baking step.

All solvent vapors in the cemented joint or joints between the hard shell sections are evaporated and driven from the joints. The heating and baking of the preformed liner or insert through heat transmissively applied in the baking operation to the inner and outer hard shells expands the premolded foam plastic (in this case, styrene) to, if desired, fill the entire insulation space thereby reinforcing the entire assembly. In some instances, it is desirable to continue the baking operation to the point where the foam liner or insert is expanded to bond and adhere to the outer hard shell only nevertheless filling however, substantially all the space but leaving as shown in FIG. 2, a very slight space between the inner hard shell and the liner. This construction may be readily accomplished by baking the assembled receptacle and controlling the baking so that less heat is applied to the inner shell than to the outer shell. To do this, the assembled double walled structure may be positioned to direct the bottom and peripheral portions against the moving hot air with the inner shell disposed rearwardly or a partial closure means may be used for shielding the central portion of the inner shell. The lessening of temperature applied to the inner shell member is preferably desirable for maintaining a slight clearance between the inner shell and the foam insert in containers of the type having a reversely curved peripheral wall such as the pitcher-type server illustrated in FIG. 3.

In the next step of my process after cooling, the vent apertures (7b in the body of the receptacle and 10b in the double wall lid member) are closed and sealed by inserting and cementing a small plug member 17 into the bottom apertured portion 7b of the outer shell member 7 of the receptacle and by cementing the closure handle cap 12 to the annular bossed portion of the top of outer shell member 10 of the lid.

The venting of the insulating chambers of the double walled structure has an important effect in producing a perfect final assembly. Its first importance is in the initial assembly of the cemented joint between the hard shells at which time a slight internal vapor pressure is generated by two factors—(1) the evaporation of solvent vapors at the joint; and (2) mechanical displacement or piston effect of the bringing of the two hard shell members together at the slip joint or abutment portions. If such pressure is not relieved to balance the ambient atmosphere as the joint is formed, the unbalanced pressure would tend to find the weakest part of the joint and form a channel while the cement is soft. This channel would then harden and create a leakage, ruining the effectiveness of the insulating medium.

From the foregoing it will be seen that a novel structure produced by my process requires expansion and adhesion of at least the entire exterior area of the insert to the inner, preferably metal coated area of the hard outer shell member, thereby most effectively reinforcing not only the bonded sealed joints between the hard shell members, but effectively reinforcing the entire double wall shell construction to substantially eliminate deformation as by warping and varying ambient temperature conditions. This solid reinforcing effect is obtained through the expanded foam type insert without to any appreciable extent increasing the weight of the double walled thin shell construction since the styrene foam plastic or equivalent insulator and reinforcing medium when expanded, weighs approximately $\frac{1}{16}$ of a pound for each 8th of a cubic foot.

The heat insulating efficiency of the completed structure is very high and if desired, may be slightly increased by placing a coating of reflecting material such as thin metal foil or metallic spray upon the exterior surfaces of the inner shell, or by making the preformed insulation insert of laminations including layers of molded foam plastic and intervening layers of aluminum foil. Such additional insulating properties however, are not necessary for the production of double walled insulating containers and receptacles utilized for containing and serving hot and cold drinks, hot and cold food and ice, under usual requirements.

My steps of venting the cemented joint and baking the assembly and carefully and uniformly applying the cement to the edges to be joined have, in careful tests shown an increase in strength of the joint of from 50 to 70% over non-baked and annealed joints.

In FIG. 3, I have illustrated a completed, pitcher-type beverage server having a reversely curved symmetrical body shape, and which is produced and constructed in general conformity with my unique process previously described.

Because the general shape of the body is reversely curved, two sets of shell assemblies including preformed insulating and reinforcing inserts are desirable for commercial manufacture.

Thus, the lower portion of the receptacle body indicated as an entirety as by the letter L is produced similarly to the production of the receptacle body shown in FIGS. 1 and 2 consisting in an upwardly flared cup-shaped hard shell 20 having a venting aperture 20a formed in the center of the bottom thereof and having an annular slip joint flange 20b provided at the upper open edge thereof.

The inner hard shell member 21 is of the same general configuration as shown in outer shell 20 but of smaller dimension to leave when the shells are assembled, an insulating chamber 22 which is substantially filled with the expanded foam type plastic insert or liner 23' of symmetrical shape. Liner 23' is preformed in the manner previously described and is dimensioned to very loosely fit between the shells 20 and 21 until after its heat expansion in the subsequent baking step of the entire assembled device. The hard inner shell 21 at its upper open edge has a slip joint annular sealing shoulder 21a adapted for slip engagement by a complementary annular shoulder of the inner shell section 23 of the upper receptacle body.

The upper receptacle body indicated as an entirety by the letter U comprises the hard molded inner shell 23 and a symmetrical hard outer shell 24 molded preferably of a transparent heat-resisting plastic material of the class described and having applied to the interior surface thereof, a reflective preferably metal coating 25 which may consist in a sprayed layer of material or in some cases, a foil lining.

At the lower edges of the hard upper shells 23 and 24 shouldered slip joint sealing annuli 23a and 24a are provided for snug slip engagement with the joint shoulders 21a and 20b of the hard shell members of the lower body section.

In the form of FIG. 3 it will be noted that a plastic handle member 26 is attached to the outer hard shell section 24 through the medium of bolts 27 which are applied and threaded into tapped apertures 26a at the upper and lower ends of the handle prior to assembly of the hard shell sections 23 and 24 and the insertion of the foam type plastic preformed liner 28.

The upper section of the body is also provided with an additional premolded and finished neck and pouring spout shell 29 of similar heat-resisting plastic material, being substantially joined to the upper edges of shell sections 23 and 24 by annular slip joint flanges 29a and 29b as clearly shown in FIG. 3. The cementing and softening of the annular edges to be slip joined is carried out in my process after loose insertion of the preformed foam type plastic insert 28 and after attachment of the handle 26 but of course prior to the cemented sealed juncture between the upstanding annular sealing shoulders or flanges of the lower section of the receptacle with the upper body section U. In this connection it will be noted that the shells 23 and 24 taper ornately inwardly from the lower edges or skirts thereof so that prior to assembly and sealed juncture of the neck and spout section 29, the foam plastic liner may be readily and loosely interposed between the shells 23 and 24.

I provide as a closure for the top of the receptacle of FIG. 3 as shown, a hinged double shell plug type lid indicated as an entirety by the letter P which comprises a substantially cup-shaped hard inner shell member 30 and a top or exterior plug lid sheil 31. These shells 30 and 31 as shown may be joined with sealed effect with the substantial foam type expansible insert 32 interposed therebetween along an outturned annular sealing flange 30a provided at the upper edge of the inner shell 30 and a downturned sealing edge 31a provided concentrically therewith and integrally formed with the upper shell 31.

The shells 30 and 31 with the intermediate insert 32 are assembled, vented and baked in the manner and with similar operation in the process to the assembly of the lid section of the receptacle illustrated in FIGS. 1 and 2.

What is claimed is:

1. The process of making insulated plastic receptacles for use as food and beverage containers which consists in molding similarly shaped inner and outer shells constructed from a high heat-resisting grade of plastic with said inner shell being dimensionally somewhat smaller than said outer shell to leave an insulating chamber between said shells when the same are concentrically assembled, preforming an insulation insert constructed of heat-expansible plastic and shaped and dimensioned to loosely fit between said shells when the latter are concentrically assembled, concentrically assembling said shells and said insert with said insulating insert disposed loosely between said shells, joining edge portions of said inner and outer shells with sealing effect between the joined edge portion areas and in said joining step venting the space between said shells to permit escape of vapors and air, then baking the shells so assembled at a temperature below that at which said shells will melt and above the temperature for producing expansion of the plastic insert and thereby expanding said insert, and during said baking and expansion of said insert venting said insulating chamber, cooling the baked assembled shells, and thereafter exteriorly closing said chamber to prevent further venting of said insulated chamber and ingress of ambient air into said chamber.

2. The steps in the process of making insulated plastic receptacles which consist in preforming similarly shaped inner and outer shells constructed from a high heat-resisting grade of plastic material with said inner shell being dimensionally somewhat smaller than said outer shell to leave an insulating chamber therebetween when same are concentrically assembled, preforming an insulation and reinforcing insert constructed of heat-expansible plastic and shaped and dimensioned to very loosely fit between said shells, concentrically assembling said shells and said insert, joining edge portions of said inner and outer shells with sealing effect between the joined edge portion areas, and baking the shells so assembled at a temperature below the critical deformation temperature of said shells and above the temperature for producing expansion of the plastic insert.

3. The steps set forth in preceding claim 2 further characterized by, in the carrying out of said baking step, applying heat transmissively to said insulating and reinforcing insert through said shells and controlling application of heat to said shells to apply heat at less temperature to said inner shell than to said outer shell.

4. The steps in the process of making insulated receptacles which consist in preforming similarly shaped inner and outer shells with said inner shell being dimensionally somewhat smaller than said outer shell to leave an insulating chamber therebetween when the same are concentrically assembled, preforming an insulation reinforcing insert constructed of heat-expansible insulating material and shaped and dimensioned to very loosely fit between said shells, concentrically assembling said shells and said insert, joining edge portions of said inner and outer shells with sealing effect between the joined edge portion areas, and baking the shells so assembled at a temperature below that at which said shells will melt and above the temperature for producing expansion of said insulating material for producing expansion of said material in said insulating chamber.

References Cited in the file of this patent

UNITED STATES PATENTS

| | | |
|---|---|---|
| Re. 24,767 | Simon et al. | Jan. 19, 1960 |
| 2,097,694 | Hochstetter | Nov. 2, 1937 |
| 2,339,221 | Gulick | Jan. 11, 1944 |
| 2,552,641 | Morrison | May 15, 1951 |
| 2,599,332 | Kirman | June 3, 1952 |
| 2,633,264 | Dinsmore et al. | Mar. 31, 1953 |
| 2,642,920 | Simon et al. | June 23, 1953 |
| 2,690,987 | Jeffries et al. | Oct. 5, 1954 |
| 2,742,169 | Bramming | Apr. 17, 1956 |
| 2,759,617 | Gauthier | Aug. 21, 1956 |
| 2,770,406 | Lane | Nov. 13, 1956 |
| 2,781,820 | Rodgers | Feb. 19, 1957 |
| 2,805,787 | Sherman | Sept. 10, 1957 |
| 2,837,232 | Rossi | June 3, 1958 |
| 2,855,021 | Hoppe | Oct. 7, 1958 |
| 2,895,603 | Freeman | July 21, 1959 |
| 2,922,278 | Rae | Jan. 26, 1960 |
| 2,954,589 | Brown | Oct. 4, 1960 |
| 2,971,640 | Snelling | Feb. 14, 1961 |
| 2,985,287 | Schulz | May 23, 1961 |
| 3,013,922 | Fisher | Dec. 19, 1961 |

FOREIGN PATENTS

| | | |
|---|---|---|
| 796,450 | Great Britain | June 11, 1958 |